US010223261B2

United States Patent
Baek et al.

(10) Patent No.: US 10,223,261 B2
(45) Date of Patent: Mar. 5, 2019

(54) LIGHTWEIGHT ARCHITECTURE FOR ALIASED MEMORY OPERATIONS

(71) Applicant: UNIST (ULSAN NATIONAL INSTITUTE OF SCIENCE AND TECHNOLOGY), Ulsan (KR)

(72) Inventors: Woongki Baek, Ulsan (KR); Seung Hoe Kim, Ulsan (KR)

(73) Assignee: UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 0 days.

(21) Appl. No.: 15/393,526

(22) Filed: Dec. 29, 2016

(65) Prior Publication Data

US 2017/0308465 A1 Oct. 26, 2017

(30) Foreign Application Priority Data

Apr. 20, 2016 (KR) .......................... 10-2016-0048127

(51) Int. Cl.
*G06F 12/0802* (2016.01)
*G06F 12/1045* (2016.01)
*G06F 12/1027* (2016.01)

(52) U.S. Cl.
CPC ...... *G06F 12/0802* (2013.01); *G06F 12/1027* (2013.01); *G06F 12/1063* (2013.01); *G06F 2212/1016* (2013.01); *G06F 2212/656* (2013.01)

(58) Field of Classification Search
CPC ............. G06F 12/0802; G06F 12/1027; G06F 2212/1016
See application file for complete search history.

(56) References Cited

U.S. PATENT DOCUMENTS 7,017,024 B2 * 3/2006 Arimilli .................. G06F 12/08
711/104
2004/0064672 A1 * 4/2004 Fleming .............. G06F 12/1018
711/207
(Continued)

FOREIGN PATENT DOCUMENTS

KR 10-2013-0109247 A 10/2013

OTHER PUBLICATIONS

Notice of Allowance dated Jan. 31, 2018 from Korean Patent Office in a counterpart Korean Patent Application No. 10-2016-0048127 (English translation is also submitted herewith).

*Primary Examiner* — Michael Alsip
(74) *Attorney, Agent, or Firm* — The PL Law Group, PLLC (57) ABSTRACT

A lightweight architecture for an aliased memory operation includes loading data by performing an aliased memory operation, and storing data by performing an aliased memory operation, the loading of data by performed by an aliased memory operation that includes: requesting an aliased address through an HAT without a specific operation for converting an address by means of a CPU processor, converting an address input through the HAT into an aliased address in response to the request for an aliased address, stopping the aliased memory operation through the HAT and calling up a miss handler when the conversion of an address into an aliased address in response to the request for an aliased address fails, and loading data by accessing an SAT using the aliased address when conversion of an address into an aliased address succeeds.

6 Claims, 6 Drawing Sheets

(56) References Cited

U.S. PATENT DOCUMENTS

2004/0117587 A1* 6/2004 Arimilli .................. G06F 12/08
                                                711/203
2004/0117590 A1* 6/2004 Arimilli .............. G06F 12/0802
                                                711/203

* cited by examiner

LIGHTWEIGHT ARCHITECTURE FOR ALIASED MEMORY OPERATIONS

CROSS REFERENCE TO RELATED APPLICATION

The present application claims priority to Korean Patent Application No. KR 10-2016-0048127, filed Apr. 20, 2016, the entire contents of which is incorporated herein for all purposes by this reference.

BACKGROUND

1. Field of the Invention

The present invention relates to a CPU cache architecture and, more particularly, to a lightweight architecture for aliased memory operations, the architecture being able to further improve the performance of a CPU by supporting aliased memory operations in terms of hardware only with minimum modifications of an architecture by reducing address conversion operations, which are executed at tens of to hundreds of cycles in the CPU in aliased memory operations, into one or two cycles by adding a hardware alias table (HAT).

2. Description of the Related Art

A microprocessor is also called a processor, a core, and a central processing unit (CPU). A cache of a CPU is physically a high-speed memory structure disposed between a main memory and a CPU in a computer.

The object of the cache in a CPU is to reduce a data access time and an effective memory access time for executing commands. Such a cache keeps commands that are likely to be accessed and redundant copies of data in a memory physically close to a CPU, thereby using space and time locality. In particular, writing and reading on a cache would be several-times faster than writing and reading on external memories (e.g. external DRAM, SRAM, flash memory and/or a storage such as a tape or a disk, which will be generally referred to as "external memories).

An example of using a cache in a CPU can be seen from Korean Patent Application Publication No. 2013-0109247 (published on 7 Oct., 2013). According to this document, when a requested data or command does not exist in a cache, a cache miss is generated and the data or command is transmitted from an external memory. That is, it can be seen that an effective memory access time of a single level cache is "cache access time"×"cache hit rate"+"cache miss penalty"×cache miss rate". If a multi-level cache is used, the effective memory access time is further reduced. In other words, as the level of caches increases, the size gradually increases and they are related to gradually increasing cache "miss" penalty. Accordingly, common microprocessors generally require a level 1 cache access time of 10-30 CPU clock cycles, a level 2 cache access time of 10-80 clock cycles, and an off-chip access time of 80-200 clock cycles.

An aliased memory operation is used to safely perform operations without damage to original data by creating a copy when accessing a specific space in a memory.

The aliased memory operation has been performed in a software type because there has been no hardware support from CPU architectures in the related art, in which copies are created and recorded in a software alias table (SAT), which is a table using a memory address before being changed as a key. When it is requested to write an address on an aliased memory, a CPU performs a series of operations for converting the requested address, which is called hashing, whereby it finds out the address where a copy is supposed to be kept in an SAT and keeps information to be recorded at the address. When it is requested to read an aliased memory, a CPU finds out the memory address where a copy is kept through hashing, and when a copy of the value of the requested address actually exists at the position in the SAT, the CPU reads the value of the copy, but when there is no copy, the CPU reads the original value of the address before it is changed.

Since the SAT that is used for aliased memory operations is kept in a memory, it is possible to quickly access it through a cache, but it is required to covert a requested address into the address in the SAT through hashing in every operation, and the conversion through hashing is performed at tens of to hundreds of cycles in the CPU, so it takes a long time to access copies in the SAT and there is a limit in improving the ability for aliased memory operations.

SUMMARY

In order to solve the problems, an aspect of the present invention is to provide a lightweight architecture for aliased memory operations, the architecture being able to further improve the performance of a CPU by supporting aliased memory operations in terms of hardware only with minimum modifications of an architecture by reducing address conversion operations, which are executed at tens of to hundreds of cycles in the CPU in aliased memory operations, into one or two cycles by adding a hardware alias table.

In order to achieve the aspects of the present invention, a lightweight architecture for aliased memory operation includes: loading data by performing an aliased memory operation; and storing data by performing an aliased memory operation, in which the loading of data by performing an aliased memory operation includes: requesting an aliased address through an HAT without a specific operation for converting an address by means of a CPU processor; converting an address input through the HAT into an aliased address in response to the request for an aliased address; stopping the aliased memory operation through the HAT and calling up a miss handler when the conversion of an address into an aliased address in response to the request for an aliased address fails; and loading data by accessing an SAT using the aliased address when conversion of an address into an aliased address succeeds.

According to the lightweight architecture for aliased memory operations, it is possible to further improve the performance of a CPU by supporting aliased memory operations in terms of hardware only with minimum modifications of an architecture by reducing address conversion operations, which are executed at tens of to hundreds of cycles in the CPU in aliased memory operations, into one or two cycles by adding a hardware alias table.

BRIEF DESCRIPTION OF THE DRAWINGS

The above and other aspects, features and other advantages of the present invention will be more clearly understood from the following detailed description when taken in conjunction with the accompanying drawings, in which.

DETAILED DESCRIPTION

The present invention supports aliased memory operations in terms of hardware only with minimum modifications of an architecture by reducing address conversion operations, which are executed at tens of to hundreds of cycles in the CPU, into one or two cycles by adding an HAT. Accordingly, it is possible to further improve the CPU performance in terms of operation speed, and particularly, aliased loading is requested through the HAT without a specific operation in a CPU core by reducing aliased memory operations into one or two cycles using the HAT. Further, when the loading fails, addresses converted in the HAT before a miss handler is finished are stored when an SAT hit is generated by calling up the HAT miss handler that operates similarly to the case when an aliased memory operation is not applied.

Hereinafter, embodiments of the present invention are described in detail with reference to the accompanying drawings.

Figure 1:
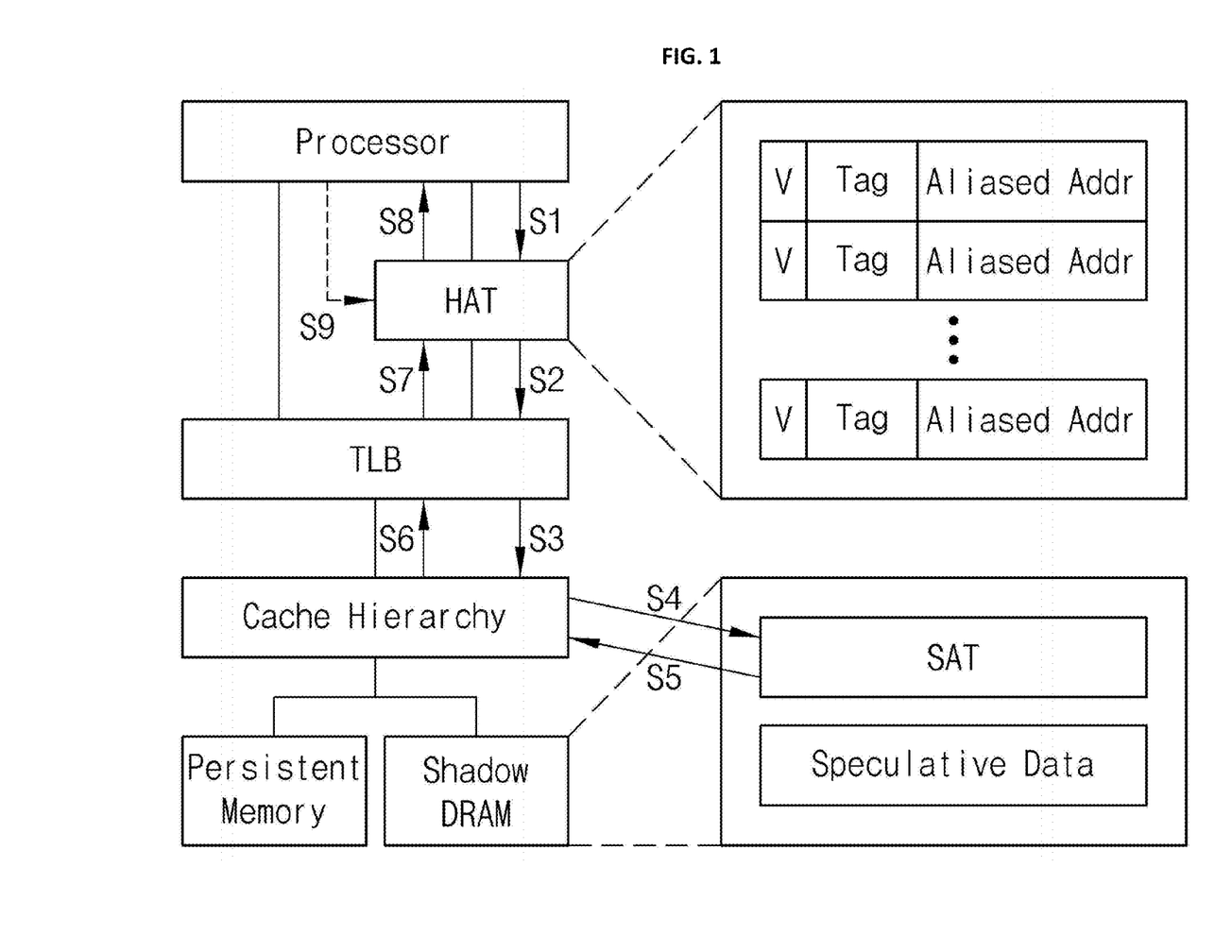
FIG. 1 is an architecture for illustrating a method of loading data through an aliased memory calculation according to an embodiment of the present invention.

FIG. 1 is an architecture for illustrating a method of loading data through an aliased memory calculation according to an embodiment of the present invention.

Referring to FIG. 1, when data is loaded through an aliased memory operation, processes of loading data using aliased addresses are sequentially performed from a step S1 of requesting an aliased address by means of a CPU processor to a step S8 in accordance with a data loading command without a specific operation for converting addresses.

In detail, the CPU processor requests an address converted through the HAT without a specific operation for converting an address (S1), and when an HAT hit is generated, a converted address kept in the HAT is transmitted to a TLB (S2). The CPU processor accesses the position of a copy kept in a SAT through a cache hierarchy using the converted address (S3 and S4). The value kept at the position is transmitted to the CPU processor through the cache hierarchy (S5, S6, S7, and S8), so data is loaded using the aliased address.

Figure 2:
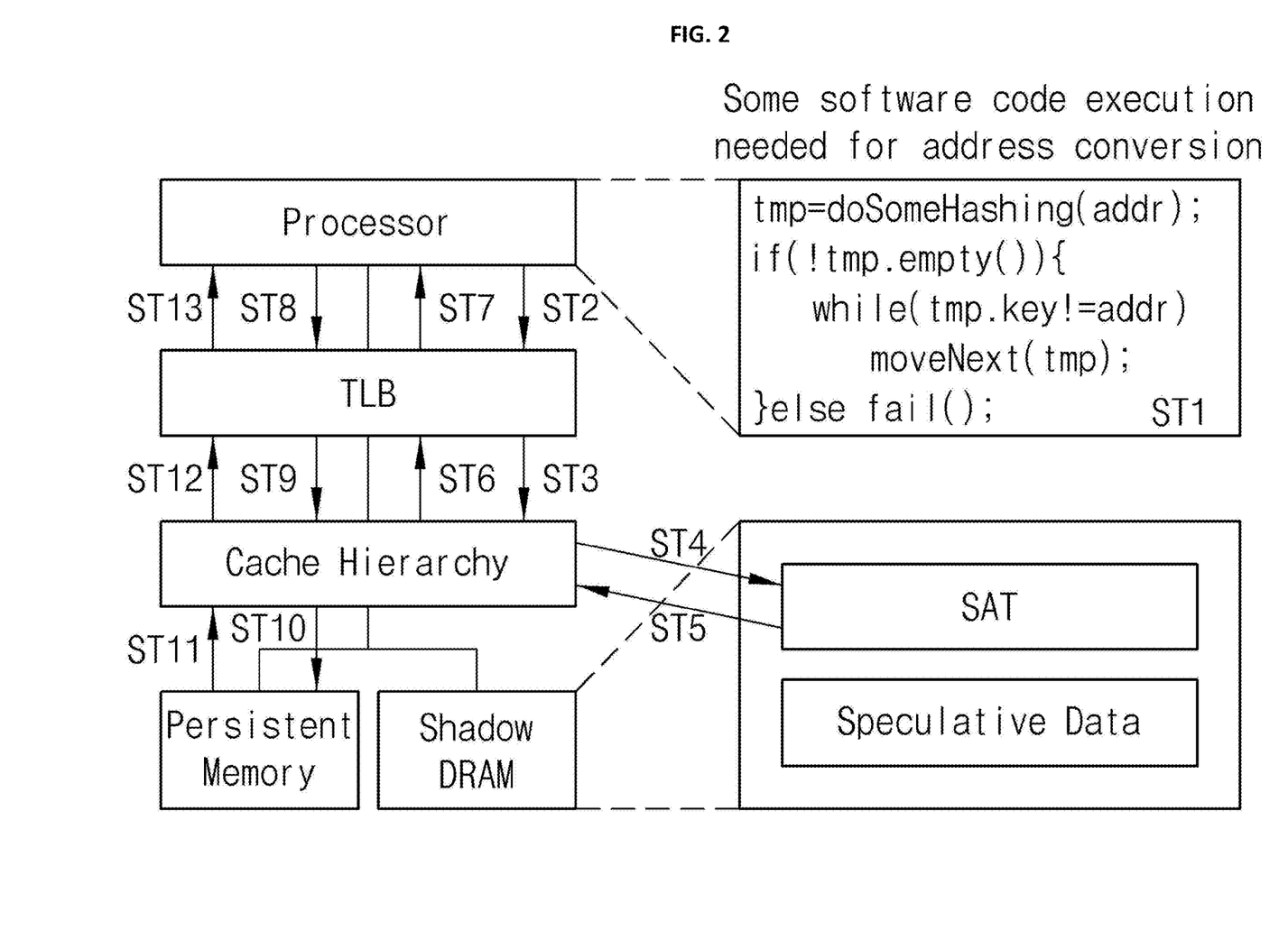
FIG. 2 is an architecture for illustrating a method of loading data when an aliased memory operation fails.

However, when converting an address through the HAT in response to the request for an aliased address fails, an alias memory operation through the HAT is not performed, but a miss handler shown in FIG. 2 is called up, thereby converting the address in terms of software and then storing the result in the HAT (S9).

FIG. 2 is an architecture for illustrating a method of loading data when an aliased memory operation fails.

As shown in FIG. 2, when creating an aliased address in response to a request for an aliased address fails and a miss handler is called up rather than performing an aliased memory operation through the HAT, the CPU processor executes a software code for address conversion (ST1).

When converting the address in response to a request for reading out an address, as shown in FIG. 2, an aliased memory operation through the HAT is stopped and a miss handler is called up, and the CPU processor executes a software code for address conversion (ST1).

After the software code is executed, the value at the corresponding position in the SAT is read out through a TLB and the cache hierarchy. That is, the address converted into a software code is transmitted to the SAT through the cache hierarchy and whether it is a hit/miss is checked (ST3 and ST4), and when an SAT hit is generated, the data kept at the corresponding position is transmitted to the CPU processor through the cache hierarchy, whereby data is loaded through an aliased operation in response to the software code. If there is no effective entry in the SAT after steps ST1 to ST7 are performed, values are read out from the spaces of non-converted addresses (ST8 to ST13).

Assuming that the time taken to load data under an HAT hit using an aliased address is Tc and the time taken to load data after performing an address operation by executing a software code is Ta, Tc is smaller than Ta (Tc<Ta) because it is possible to reduce address conversion performed at tens to hundreds of cycles in the CPU using the HAT into one or two cycles.

If there is no effective entry in the SAT as a result of the process of loading data after performing the address operation by executing the software code, the value of a non-converted address is read out. Assuming that the time taken to read out the value of a non-converted address is Tb, the time taken until an HAT miss and SAT miss are generated is (Tc+Ta+Tb). When an HAT miss and an SAT hit are generated, the time may be expressed as (Tc+Ta+x). In this case, x is the time taken to store the address converted through the HAT miss handler in the HAT. Accordingly, the time taken until an HAT miss and an SAT hit are generated (Tc+Ta+x) is larger than the time Ta taken until an SAT hit is generated without the HAT ((Tc+Ta+x)>Ta), and the time (Tc+Ta+Tb) taken until both the HAT miss and SAT miss are generated with the HAT applied is larger than the time (Ta+Tb) taken until an SAT miss is generated without the HAT ((Tc+Ta+Tb)>(Ta+Tb)).

There are two cases in which many cycles are required as compared with a situation of not performing an aliased memory calculation, but when many HAT hits are generated, it is possible to obtain gains sufficient to offset the additional cycles.

Figure 3:
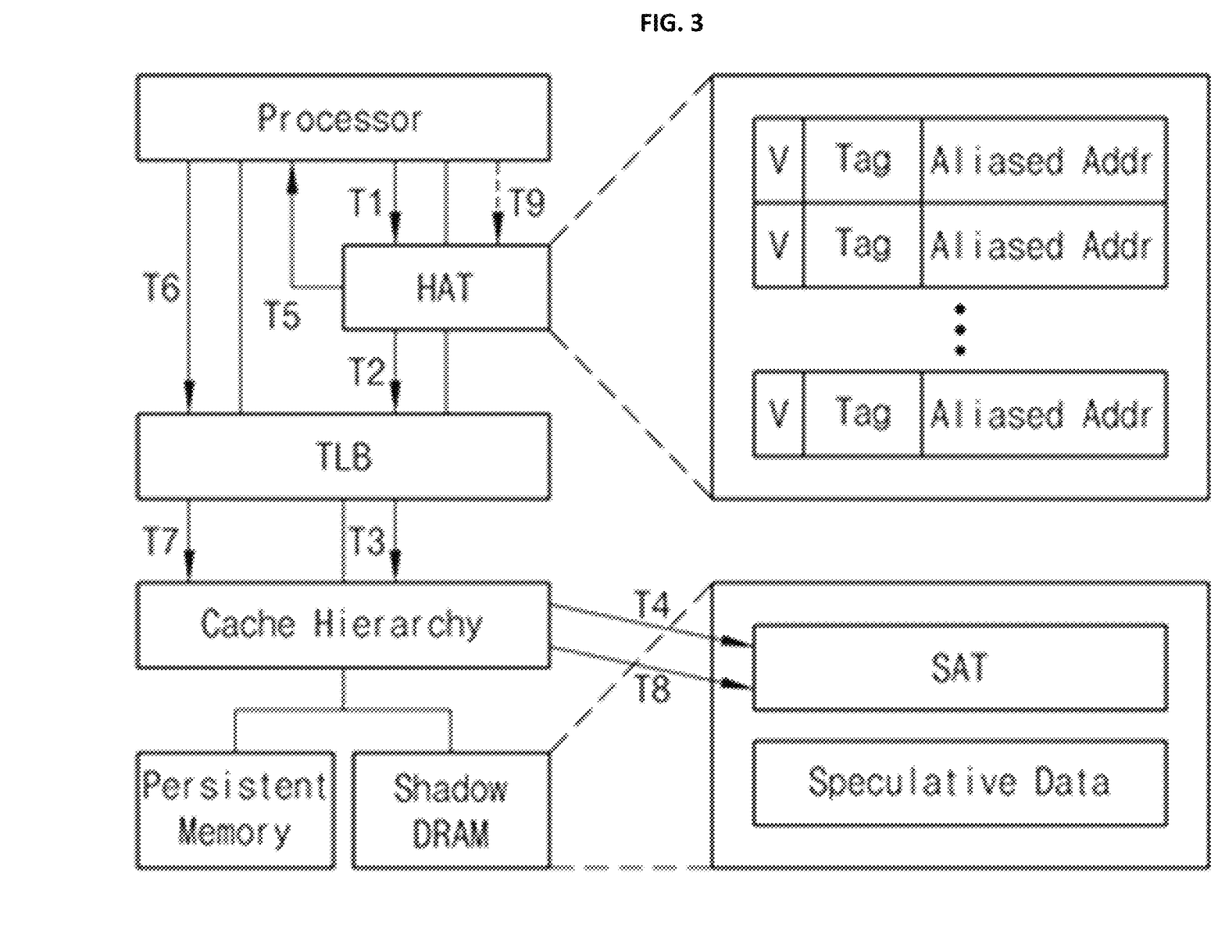
FIG. 3 is an architecture for illustrating a process of storing data through an aliased memory operation.

FIG. 3 is an architecture for illustrating a process of storing data through an aliased memory operation.

Referring to FIG. 3, when data is stored through an aliased memory operation, processes of storing data using aliased addresses are sequentially performed from a step T1 of requesting an aliased address by means of a CPU to a step T4 or T7, if necessary, in accordance with a data storing command without a specific operation for converting addresses.

In detail, the CPU processor requests an address converted through the HAT without a specific operation for converting an address (T1), and when an HAT hit is generated, a converted address kept in the HAT is transmitted to a TLB (T2).

Accordingly, the converted address and the value to be stored are transmitted to the SAT through a cache hierarchy (T3 and T4) and recorded in the SAT, and a process of storing data using the aliased address is performed.

Figure 4:
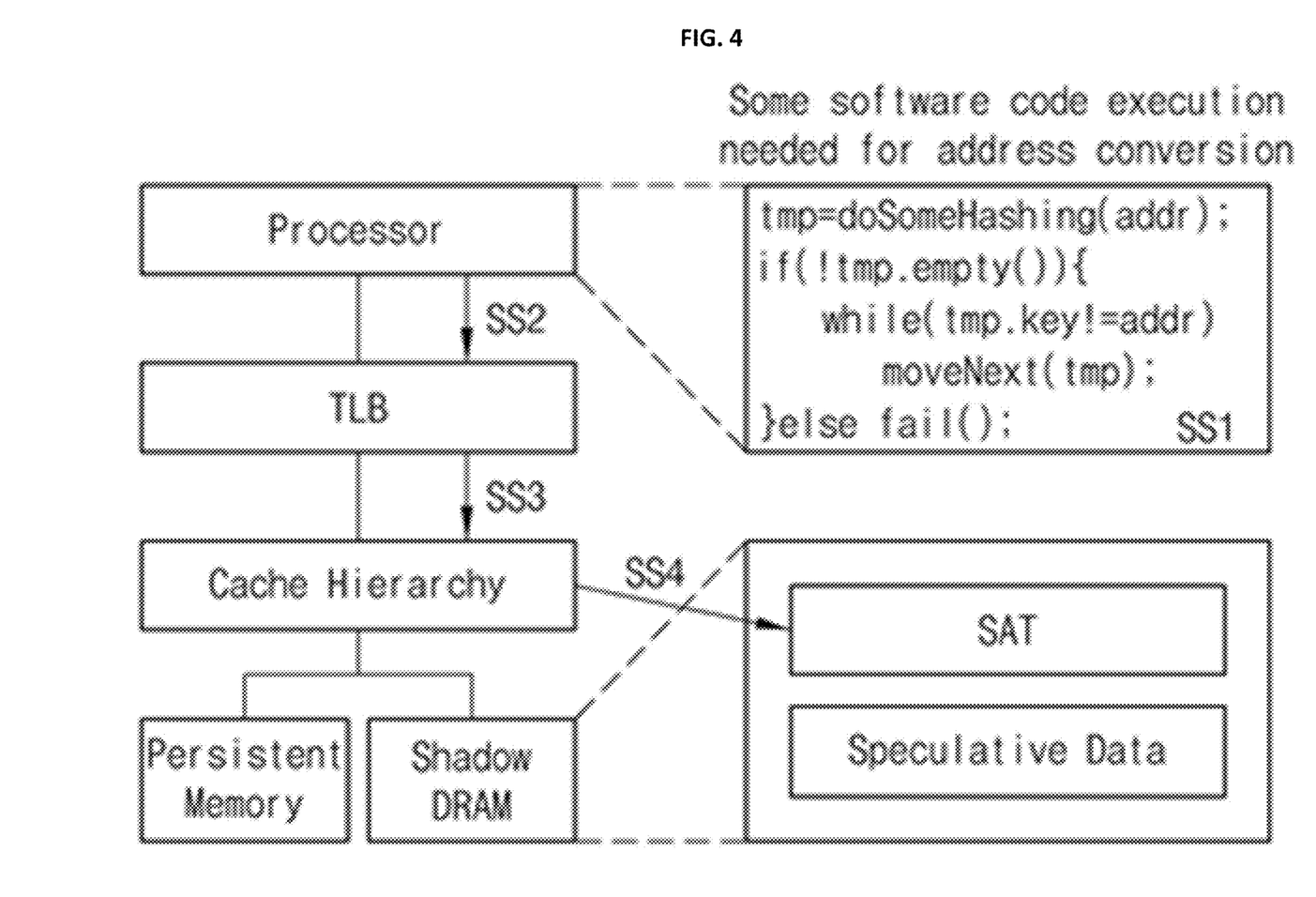
FIG. 4 is an architecture for illustrating a method of storing data when an aliased memory operation fails.

However, when converting a (T1) address in the HAT in response to a request for an aliased address fails, the aliased memory operation through the HAT is stopped, the miss handler shown in FIG. 4 is called up (T5), and a value is recorded at a correct position in the SAT found from the miss handler through the cache hierarchy (T6 and T7).

FIG. 4 is an architecture for illustrating a method of storing data when an aliased memory operation fails.

As shown in FIG. 4, when converting an address in response to a request for aliased writing fails, an aliased memory calculation through the HAT is stopped, the miss handler is called up, and the CPU processor executes a software code for address conversion (SS1).

After the software code is executed, a value is stored at a corresponding position in the SAT through the TLB (SS2) and the cache hierarchy (SS3 and SS4) so that data is stored through the aliased operation according to the software code. Unlike loading data through an aliased operation, even if there is no effective entry in the SAT as a result of performing step SS1 to SS4, the original is not accessed, and a new entry is crated in the SAT and the data is recorded in the entry.

Assuming that the time taken to access the HAT under an HAT hit situation using an aliased address is x, the time taken to attempt storing data at a corresponding position in the SAT after address conversion is completed in the HAT is Tb, and the time taken to store data after performing an address operation by executing a software code under an environment without the HAT is Ta, the required time when an HAT hit is generated (Tb+X) is smaller than Ta ((Tb+x)<Ta) because it is possible to reduce the address conversion performed at tens to hundreds of cycles in the CPU into one or two cycles.

If there is no effective entry in the SAT as a result of performing the process of storing data after performing the address operation by executing the software code, only the time taken to access the SAT and the time taken to storing the address conversion result in the HAT have to be considered, because there is no process of accessing the original, unlike the aliased loading operation. Accordingly, the required time for the HAT miss is obtained by adding the operation time Ta of the HAT miss handler and the time x taken to record the conversion result in the HAT to the required time for the HAT hit (Tb+x) (Tb+Ta+2x), and it is larger than Ta that is the operation time of the SAT under an environment without the HAT ((Tb+Ta+2x)>Ta).

There is a case in which many cycles are required as compared with a situation of not performing an aliased memory calculation, but when many HAT hits are generated, it is possible to obtain sufficient gains to offset the additional cycles.

Figure 5:
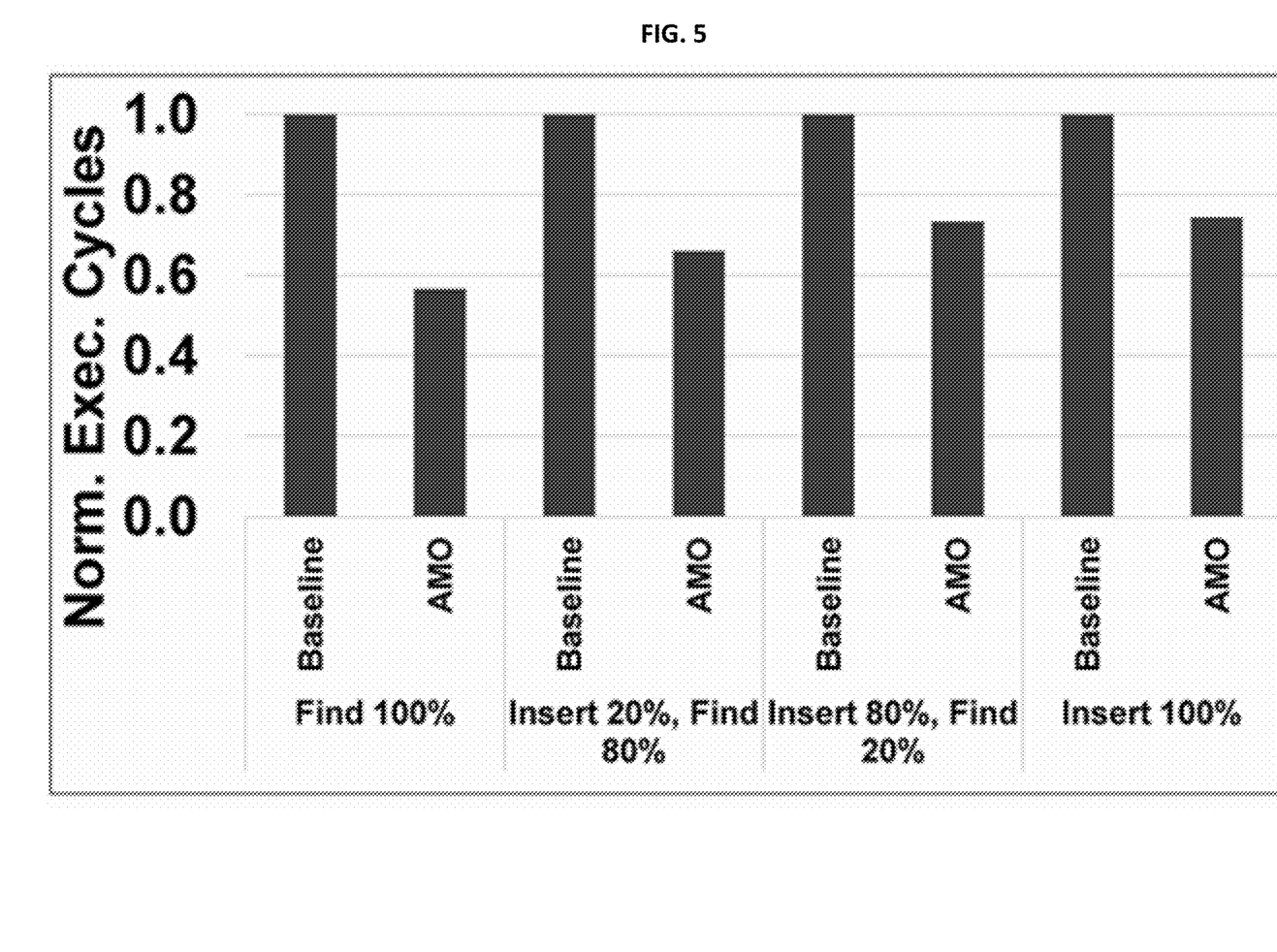
FIG. 5 is a graph comparing numbers of cycles while a B+ tree transaction is performed 500 times.
Figure 6:
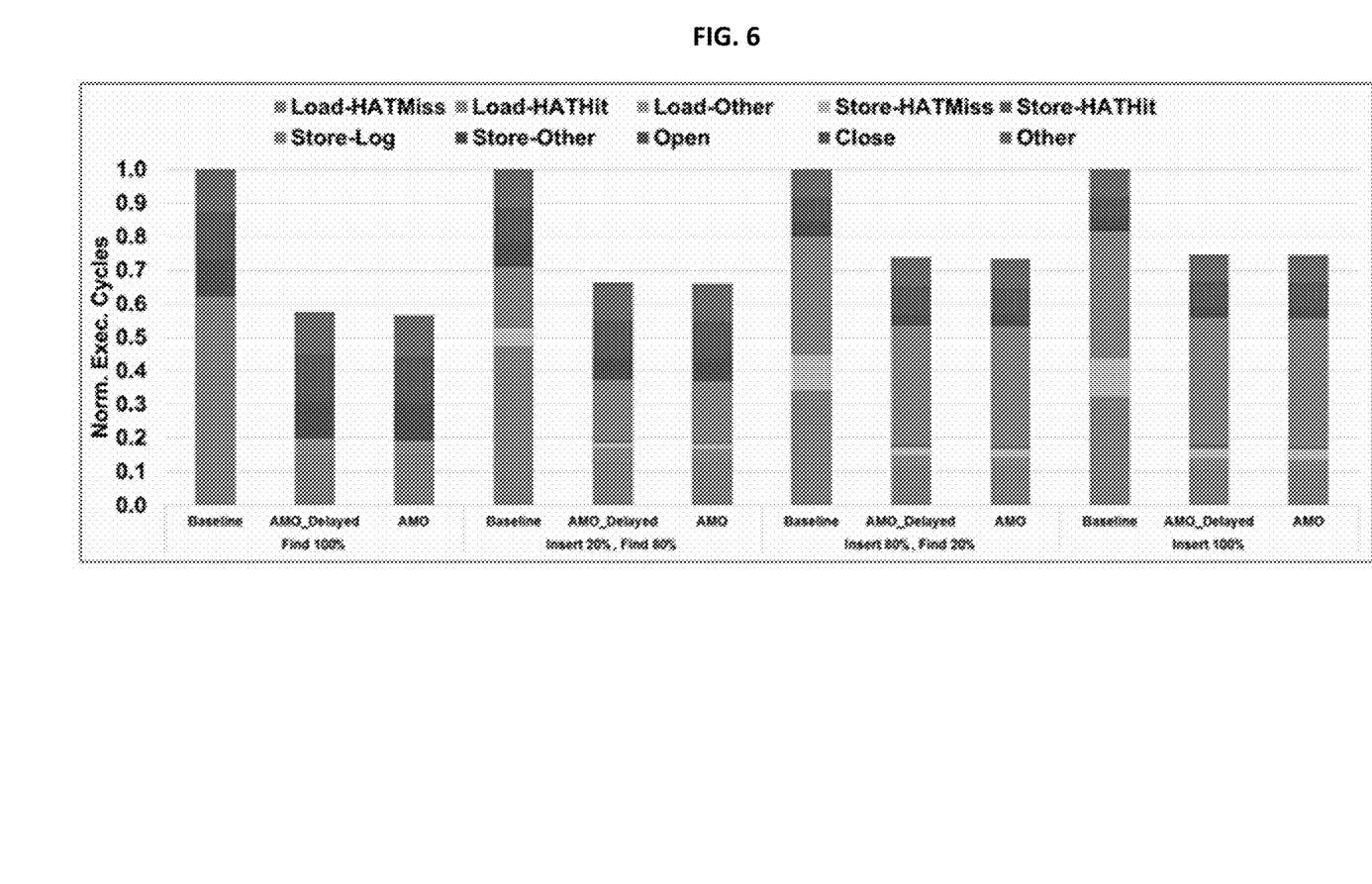
FIG. 6 is a graph illustrating a performance test result using B+ tree transaction.

FIG. 5 is a graph comparing numbers of cycles while a B+ tree transaction is performed 500 times. FIG. 6 is a graph illustrating a performance test result using a B+ tree transaction.

First, referring to FIG. 5, when CPU cycles required while a B+ tree transaction is performed 500 times are normalized, it can be seen the performance was improved by about 25~45%, depending on circumstances.

FIG. 6 shows the result of normalizing CPU cycles required for performing workload when only an SAT is used without an HAT, when a virtual HAT requiring one cycle for address conversion is used, and when an ideal HAT not requiring a cycle for address conversion is used in a persistent memory simulator constructed on Intel PIN.

The initial magnitude of the B+ tree is 5000, which is based on breakdown according to a function performed at each CPU cycle while transaction is performed 500 times. As shown in the figures, as a result of adjusting the ratio of Find/Insert in the B+ tree, it can be seen that the performance was improved by at least 25% and up to 45%.

It is possible to improve the performance by about 35% under the environment of Insert 20% and Find 80%, which is similar to common patterns of using the B+tree, and it can be seen that there is little loss in performance (around 1%), even if an HAT having an operation time in comparison to an ideal HAT of which the operation time is 0 cycles.

As described above, according to the lightweight architecture for an aliased memory operation of the present invention, it is possible to further improve the performance of a CPU by supporting aliased memory operations in terms of hardware only with minimum modifications of an architecture by reducing address conversion operations, which are executed at tens of to hundreds of cycles in the CPU in aliased memory operations, into one or two cycles by adding a hardware alias table.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method of aliased memory operation using a lightweight architecture, the method comprising:
   loading data by performing an aliased memory operation; and
   storing data by performing an aliased memory operation;
   wherein the loading of data by performing an aliased memory operation includes:
      requesting an aliased address through an HAT (Hardware Alias Table) without a specific operation for converting an address by means of a CPU (central processing unit) processor;
      converting an address input through the HAT into an aliased address in response to the request for an aliased address;
      stopping the aliased memory operation through the HAT and calling up a miss handler when the conversion of an address into an aliased address in response to the request for an aliased address fails; and
      loading data by accessing an SAT (software alias table) using the aliased address converted from the address input through the HAT when the conversion of the address input through the HAT into the aliased address succeeds.

2. The method of claim 1, wherein the loading of data by performing the aliased memory operation further includes:
   accessing a position where a data copy is kept in the SAT through a cache hierarchy using the aliased address; and
   transmitting the data copy in the SAT to the CPU processor through the cache hierarchy so that data loading using the aliased address is achieved.

3. The method of claim 1, wherein, in the loading of data, when the miss handler is called up, the method further comprising:
   executing a software code for converting an address by means of the CPU;
   checking whether an SAT hit or miss has been generated by transmitting an address converted as a result of executing the software code to the SAT through a cache hierarchy;
   transmitting data kept in a corresponding entry to the CPU processor through the cache hierarchy so that the data loading is achieved through an aliased operation according to the software code, and storing a result of address conversion in the HAT, when the SAT hit is generated; and
   transmitting data kept in an original address space before the aliased address conversion to the CPU processor through the cache hierarchy so that the data loading is achieved through an aliased operation according to the software code, when the SAT miss is generated.

4. The method of claim 1, wherein the storing of data by performing the aliased memory operation includes:
  requesting an aliased address through the HAT without a specific operation for address conversion by means of the CPU processor;
  converting an address input through the HAT into the aliased address in response to the request for the aliased address;
  stopping the aliased memory operation through the HAT and calling up the miss handler when the conversion of the address into the aliased address in response to the request for the aliased address fails; and
  storing data to a SAT using the aliased address converted from the address input through the HAT when the conversion of the address input through the HAT into the aliased address succeeds.

5. The method of claim 4, wherein the storing of data by performing the aliased memory operation further includes:
  transmitting the aliased address and data to be stored to the SAT through a cache hierarchy; and
  recording the data transmitted to the SAT at a position corresponding to the aliased address so that data storing using an aliased address is achieved.

6. The method of claim 4, wherein, in the storing of data, when the miss handler is called up when the conversion of the address into the aliased address in response to the request for the aliased address fails, the method further comprises:
  executing a software code for converting an address by means of the CPU;
  checking whether an SAT hit or miss has been generated by transmitting an address converted as a result of executing the software code to the SAT through a cache hierarchy;
  recording data in a corresponding entry so that the data is stored through an aliased operation according to the software code, when the SAT hit is generated;
  creating a new entry corresponding to the converted address and recording data so that the data is stored through an aliased operation according to the software code, when the SAT miss is generated; and
  storing a result of the address conversion in the HAT.

* * * * *